United States Patent
Ochi

(10) Patent No.: US 10,488,577 B2
(45) Date of Patent: Nov. 26, 2019

(54) ILLUMINATION DEVICE AND DISPLAY DEVICE

(71) Applicant: Japan Display Inc., Tokyo (JP)

(72) Inventor: Tetsuro Ochi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/008,435

(22) Filed: Jun. 14, 2018

(65) Prior Publication Data

US 2019/0018183 A1   Jan. 17, 2019

(30) Foreign Application Priority Data

Jul. 14, 2017   (JP) .................................. 2017-137847

(51) Int. Cl.
*F21V 7/04* (2006.01)
*F21V 8/00* (2006.01)
*G09G 3/34* (2006.01)

(52) U.S. Cl.
CPC ......... *G02B 6/0061* (2013.01); *G02B 6/0043* (2013.01); *G02B 6/0076* (2013.01); *G02B 6/0038* (2013.01); *G02B 6/0055* (2013.01); *G02B 6/0068* (2013.01); *G09G 3/342* (2013.01); *G09G 3/3406* (2013.01)

(58) Field of Classification Search
CPC .. G02B 6/0061; G02B 6/0043; G02B 6/0076; G02B 6/0033; G02B 6/0036; G02B 6/004; G02B 6/0058; G02B 6/006
USPC ........................................................ 362/607
See application file for complete search history.

(56) References Cited

U.S. PATENT DOCUMENTS

| | | | |
|---|---|---|---|
| 2007/0147088 A1* | 6/2007 | Chien ................. | G02B 6/0038 362/616 |
| 2009/0207629 A1 | 8/2009 | Fujiyama et al. | |
| 2013/0229828 A1* | 9/2013 | Chen ................... | G02B 6/0076 362/616 |
| 2016/0320550 A1* | 11/2016 | Tsai ..................... | G02B 6/0076 |
| 2017/0192158 A1* | 7/2017 | Lee ...................... | G02B 6/0036 |

FOREIGN PATENT DOCUMENTS

JP   2009-193892 A   8/2009

* cited by examiner

*Primary Examiner* — Matthew J. Peerce
(74) *Attorney, Agent, or Firm* — Michael Best & Friedrich LLP

(57) ABSTRACT

An illumination device includes: a first light guide plate including a first and a second scattering portions and a first region not having the first and second scattering portions arranged therein; a second light guide plate including a third and a fourth scattering portions; a first illuminator emitting light to a first side surface of the first light guide plate; a second illuminator emitting light to a second side surface opposite to the first side surface; a third illuminator emitting light to a third side surface of the second light guide plate; and a fourth illuminator emitting light to a fourth side surface opposite to the third side surface. The second light guide plate overlaps the first light guide plate as viewed from a direction of the thicknesses thereof. The third and fourth scattering portions overlap the first region as viewed from the direction of the thicknesses.

10 Claims, 10 Drawing Sheets

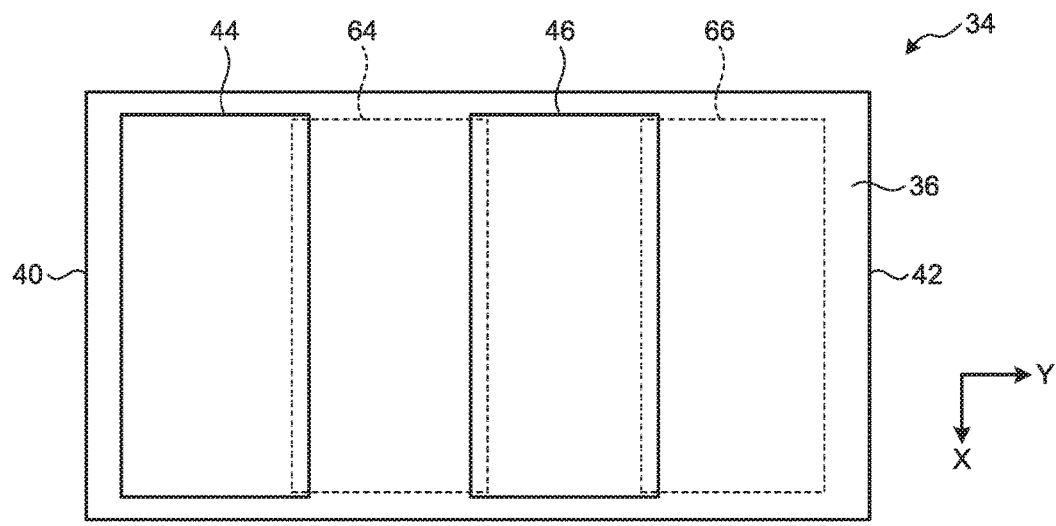
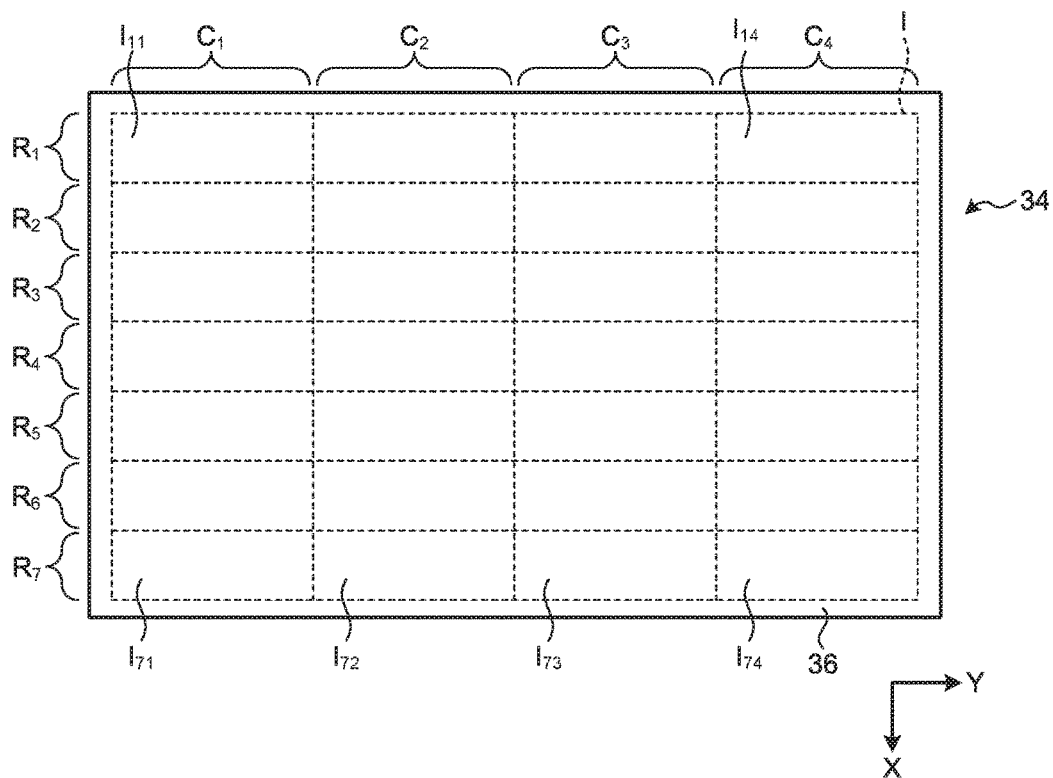

ILLUMINATION DEVICE AND DISPLAY DEVICE

CROSS-REFERENCE TO RELATED APPLICATIONS

This application claims priority from Japanese Application No. 2017-137847, filed on Jul. 14, 2017, the contents of which are incorporated by reference herein in its entirety.

BACKGROUND

1. Technical Field

The present invention relates to an illumination device and a display device.

2. Description of the Related Art

There has been known a side-lighting illumination device that includes a light guide plate and a light source element that emits light into the inside of the light guide plate through a side surface of the light guide plate. Such a side-lighting illumination device includes, for example, a scattering portion on the lower surface of the light guide plate, the scattering portion being configured to scatter light that comes into a light guide plate through a side surface thereof. Light is scattered by the scattering portion so as to be transmitted through the upper surface of the light guide plate.

Japanese Patent Application Laid-open Publication No. 2009-193892 discloses a side-lighting illumination device. Some of the side-lighting illumination devices are capable of what is called local dimming control in which to adjust luminance level for each region of the upper surface of the light guide plate.

An illumination device capable of local dimming control even when having a thinner profile is desirable.

SUMMARY

According to an aspect, an illumination device includes: a first light guide plate including a first scattering portion, a second scattering portion, and a first region having neither the first scattering portion nor the second scattering portion arranged therein; a second light guide plate including a third scattering portion and a fourth scattering portion; a first illuminator configured to emit light in a first direction to a first side surface of the first light guide plate; a second illuminator configured to emit light to a second side surface opposite to the first side surface; a third illuminator configured to emit light in the first direction to a third side surface of the second light guide plate; and a fourth illuminator configured to emit light to a fourth side surface opposite to the third side surface. The second light guide plate overlaps the first light guide plate as viewed from a direction of the thicknesses thereof (that is, in extension directions in which the first and second light guide plates extend), and the third scattering portion and the fourth scattering portion overlap the first region as viewed from the direction of the thicknesses.

According to another aspect, an illumination device includes: a first light guide plate including a first scattering portion, a second scattering portion, and a first region having neither the first scattering portion nor the second scattering portion arranged therein; a second light guide plate including a third scattering portion; a third light guide plate including a fourth scattering portion; a first illuminator configured to emit light in a first direction to a first side surface of the first light guide plate; a second illuminator configured to emit light to a second side surface opposite to the first side surface; a third illuminator configured to emit light in the first direction from a third side surface of the second light guide plate toward a fourth surface opposite to the third side surface; and a fourth illuminator configured to emit light in the first direction from a fifth side surface of the third light guide plate toward a sixth side surface opposite to the fifth side surface. The second light guide plate has an area smaller than that of the first light guide plate and overlaps the first light guide plate as viewed from a direction of thicknesses thereof (that is, in extension directions in which the first, second, and third light guide plates extend). The third light guide plate has an area smaller than that of the first light guide plate and overlaps the first light guide plate as viewed from the direction of the thicknesses in a position different from a position where the second light guide plate overlaps the first light guide plate. The third scattering portion and the fourth scattering portion overlap the first region as viewed from the direction of the thicknesses.

According to still another aspect, an illumination device includes: a first light guide plate including a first scattering portion and a first region that does not have the first scattering portion arranged therein; a second light guide plate including a second scattering portion; a third light guide plate including a third scattering portion; a first illuminator configured to emit light in a first direction from a first side surface of the first light guide plate toward a second side surface opposite to the first side surface; a second illuminator configured to emit light in the first direction from a third side surface of the second light guide plate toward a fourth side surface opposite to the third side surface; and a third illuminator configured to emit light in the first direction from a fifth side surface of the third light guide plate toward a sixth side surface opposite to the fifth side surface. The second light guide plate has an area smaller than that of the first light guide plate and overlaps the first light guide plate as viewed from a direction of thicknesses thereof (that is, in extension directions in which the first, second, and third light guide plates extend). The third light guide plate has an area smaller than that of the first light guide plate and overlaps the first light guide plate as viewed from the direction of the thicknesses in a position different from a position where the second light guide plate overlaps the first light guide plate. The second scattering portion and the third scattering portion overlap the first region as viewed from the direction of the thicknesses.

BRIEF DESCRIPTION OF THE DRAWINGS

FIG. 5 is an explanatory diagram illustrating the positional relation between a first scattering portion, a second scattering portion, a third scattering portion, and a fourth scattering portion in the illumination device according to the first embodiment;

FIG. 6 is an explanatory diagram illustrating regions of a first upper surface from which light emitted by individual light source elements exits;

DETAILED DESCRIPTION

The following describes modes (embodiments) for carrying out the invention in detail with reference to the drawings. The descriptions in the following embodiments are not intended to limit the present invention. The components described below include those that the skilled person can easily think of or those that are substantially identical to each other. Any two or more of the components described below can be used in combination as appropriate. The description merely provides examples, and modifications that the skilled person can easily arrive at as appropriate without departing from the spirit of the invention naturally fall within the scope of the present invention. The drawings may represent the widths, the thickness, the shapes, or the like of individual components not-to-scale for clearer explanation; however, the drawings merely provide examples and are not intended to limit interpretation of the present invention. Throughout this description and the drawings, components that are the same as those already described are assigned the same reference signs, and detailed description thereof may be omitted as appropriate.

In this disclosure, when an element is described as being "on" another element, the element can be directly on the other element, or there can be one or more elements between the element and the other element.

First Embodiment

Figure 1:
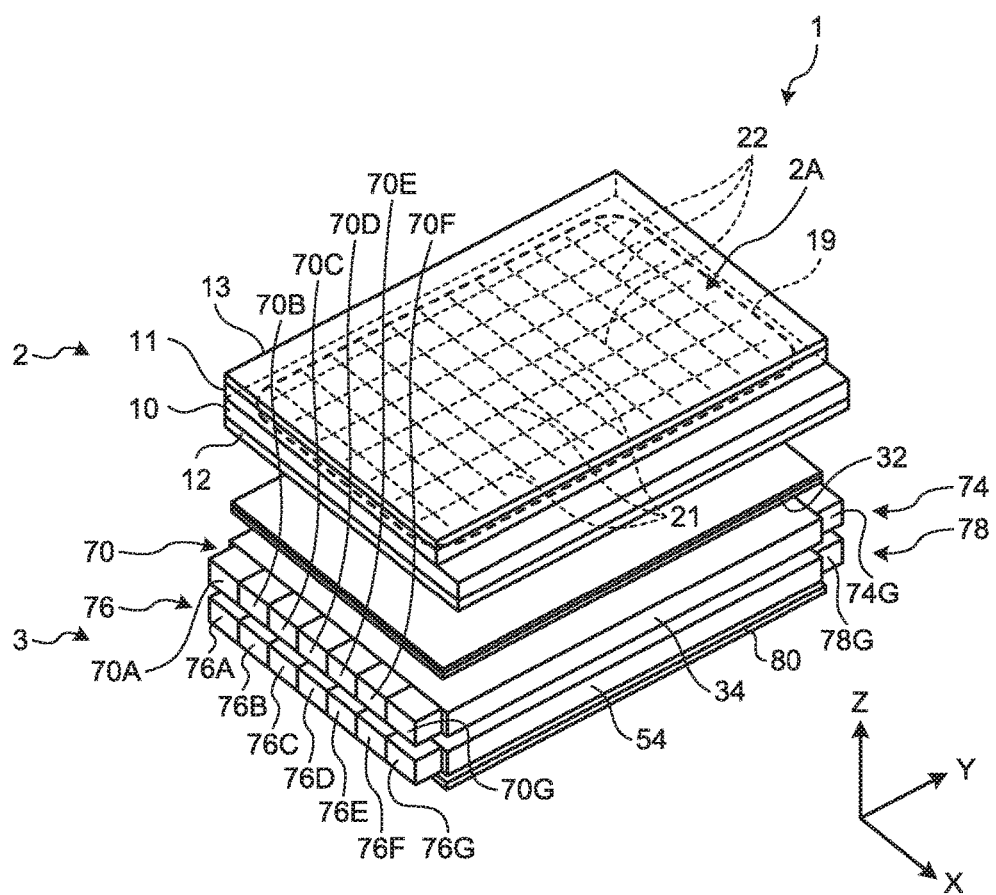
FIG. 1 is a perspective view illustrating a schematic configuration of a display device according to a first embodiment.
Figure 2:
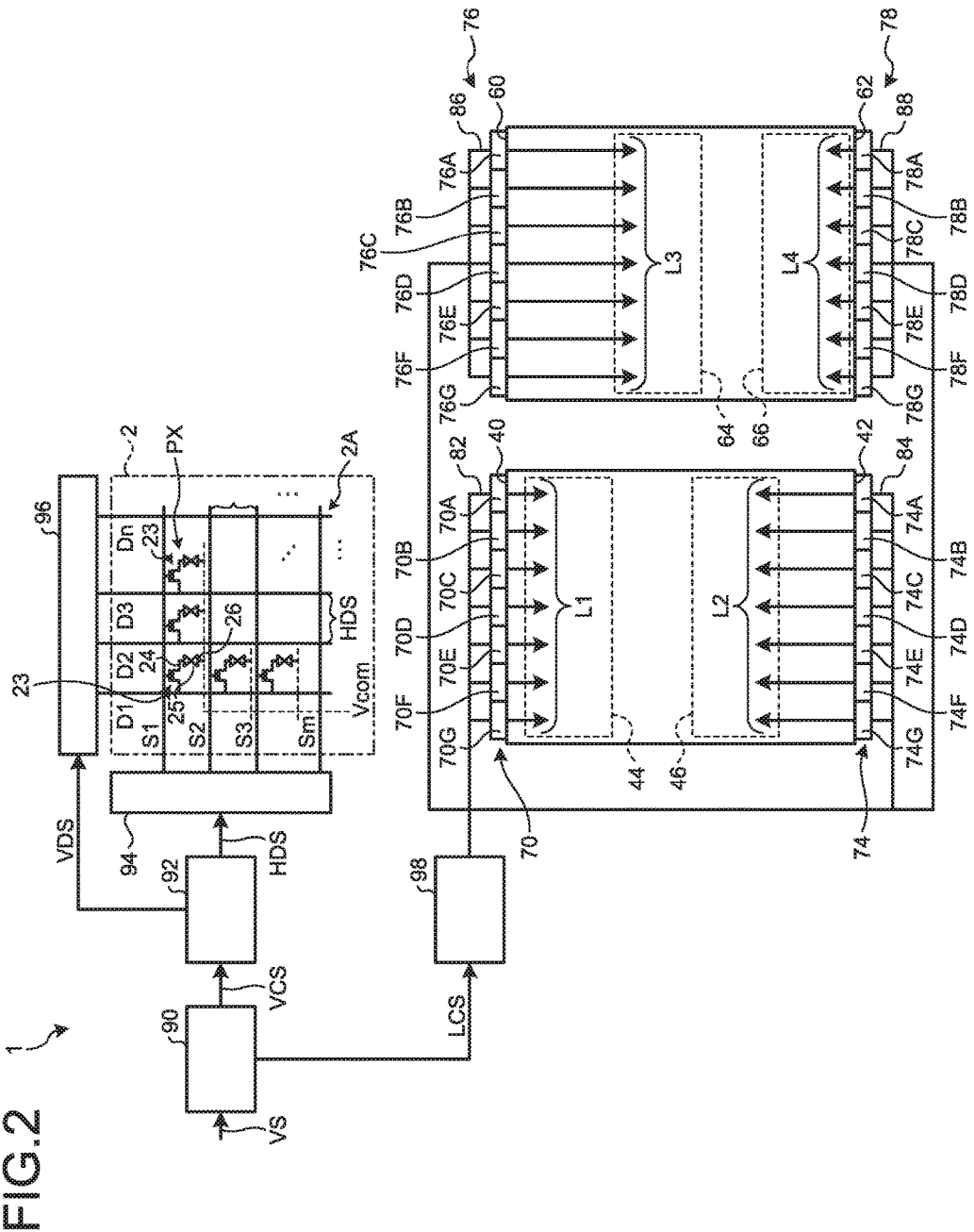
FIG. 2 is a block diagram illustrating a configuration example of the display device according to the first embodiment.
Figure 3:
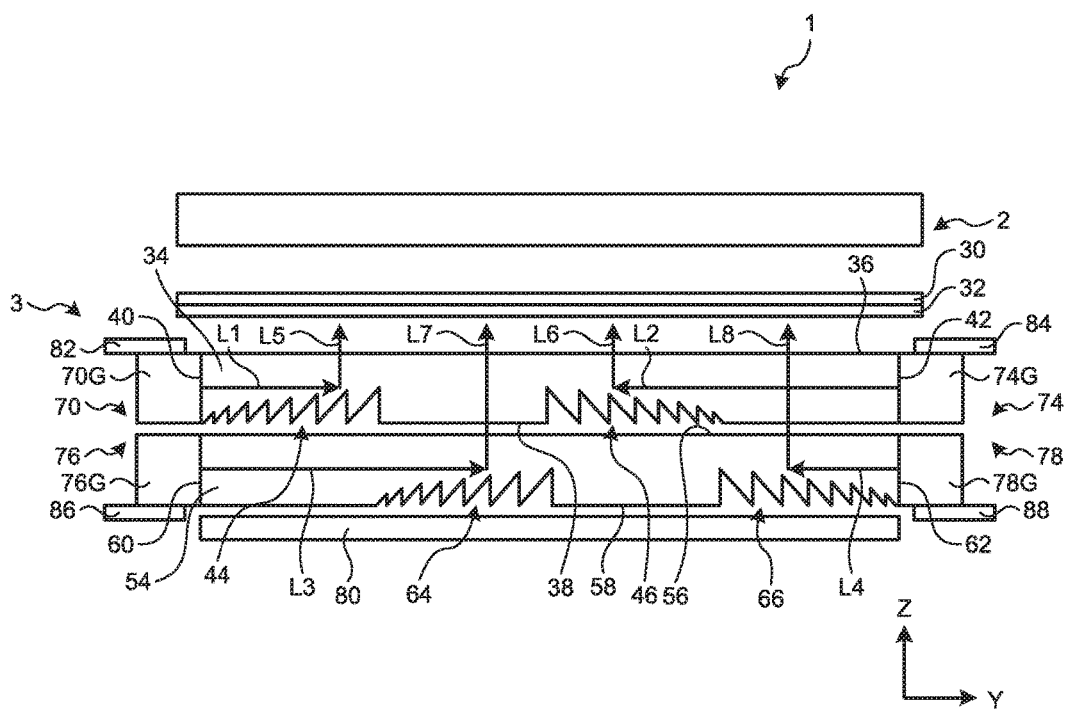
FIG. 3 is a schematic view on an arrow along the X-axis direction of an illumination device according to the first embodiment.
Figure 4:
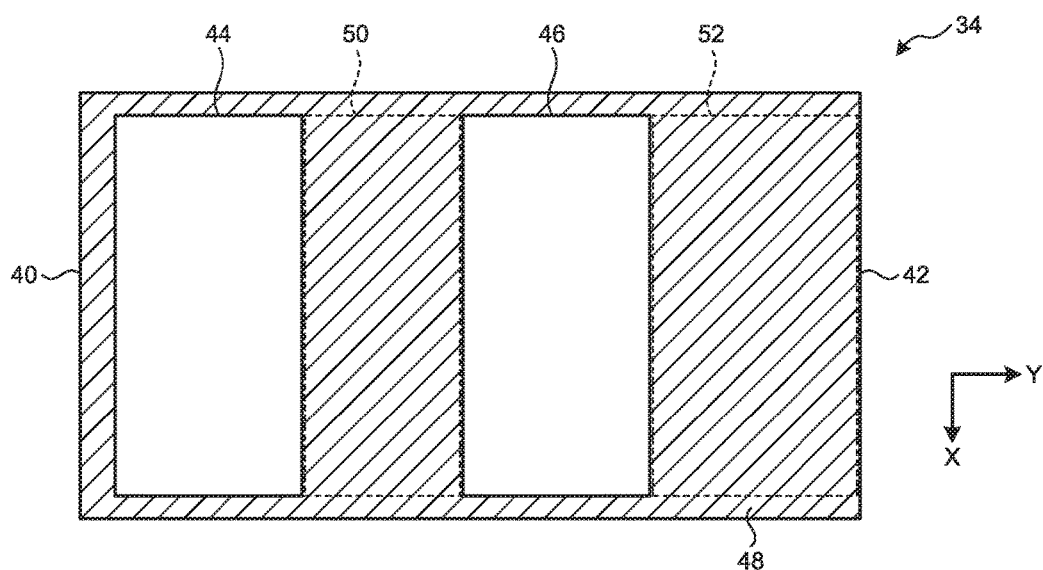
FIG. 4 is a plan view of a first light guide plate according to the first embodiment.

FIG. 1 is a perspective view illustrating a schematic configuration of a display device 1 according to a first embodiment. FIG. 2 is a block diagram illustrating a configuration example of the display device 1 according to the first embodiment. FIG. 3 is a schematic view on an arrow along the X-axis direction of an illumination device 3 according to the first embodiment. FIG. 4 is a plan view of a first light guide plate 34 according to the first embodiment. FIG. 5 is an explanatory diagram illustrating the positional relation between a first scattering portion, a second scattering portion, a third scattering portion, and a fourth scattering portion in the illumination device 3 according to the first embodiment. The shapes and positions of respective components are described below using an XYZ coordinate system. In the following description, one direction along a horizontal plane is referred to as an X-axis direction (a first direction). Another direction along a horizontal plane that is perpendicular to the X-axis direction is referred to as a Y-axis direction (a second direction). Another direction perpendicular to both the X-axis direction and the Y-axis direction is referred to as a Z-axis direction (a third direction).

As illustrated in FIG. 1 and FIG. 2, the display device 1 includes a display panel 2, the illumination device 3, an image signal controller 90, a gradation controller 92, a gate line driver 94, a data line driver 96, and a light source driver 98.

As illustrated in FIG. 1, the display panel 2 includes a first substrate 10, a second substrate 11, a first polarization plate 12, and a second polarization plate 13. The display panel 2 is configured such that the first polarization plate 12, the first substrate 10, the second substrate 11, and the second polarization plate 13 are arranged in this order along the Z-axis direction. The second substrate 11 is arranged facing the first substrate 10. A rectangular-frame shaped seal member 19 is disposed at the periphery of a facing region through which the first substrate 10 and the second substrate 11 face each other. A liquid crystal layer 25 (refer to FIG. 2) is sealed in a space surrounded by the first substrate 10, the second substrate 11, and the seal member 19. A display region 2A is provided in the space inside the seal member 19.

As illustrated in FIG. 2, the display region 2A has a plurality of gate lines 21 extending in the X direction and a plurality of data lines 22 extending in the Y direction in such a manner that the gate lines 21 and the data lines 22 form a grid as viewed from the Z-axis direction. Thin-film transistors 23 are disposed at respective intersections of the gate lines 21 and the data lines 22. The gate and the source of each of the thin-film transistors 23 are electrically coupled to the corresponding gate line 21 and the corresponding data line 22, respectively. The drain of each of the thin-film transistors 23 is electrically coupled to a pixel electrode 24.

The display region 2A has a common electrode 26 common to the pixel electrodes 24. A common potential Vcom is applied to the common electrode 26 by a power supply unit, which is not illustrated. The liquid crystal layer 25 has its orientation controlled by electric fields generated between the respective pixel electrode 24 and the common electrode 26. A region in which the orientation of the liquid crystal layer 25 is controlled by one pixel electrode 24 and the common electrode 26 is one sub-pixel PX. The display region 2A includes a plurality of the sub-pixels PX arranged in a matrix having rows and columns extending in the X direction and the Y direction.

As illustrated in FIG. 3, the display panel 2 includes a plurality of pixels P. Each of the pixels P includes a plurality of the sub-pixels PX displaying colors different from each other. The display panel 2 includes a color filter layer 28 including color filters 28f corresponding to the respective sub-pixels PX.

The color filter layer 28 includes red color filters 28r, green color filters 28g, and blue color filters 28b. Each of the pixels P includes a red sub-pixel PXr, a green sub-pixel PXg, and a blue sub-pixel PXb. The configurations of the color filter layer 28 and the pixel P are not limited to such configurations. Colors displayed by the three sub-pixels PX are not limited to red, green, and blue and may be yellow, cyan, and magenta. The number of sub-pixels PX included in each of the pixels P may be two or four or more for example.

As illustrated in FIG. 1 and FIG. 3, the illumination device 3 includes a prism sheet 30, a diffusion sheet 32, the first light guide plate 34, a second light guide plate 54, a first illuminator 70, a second illuminator 74, a third illuminator 76, a fourth illuminator 78, a reflective plate 80, and flexible printed circuits (FPCs) 82, 84, 86, and 88. In the following description, each of the first illuminator 70, the second illuminator 74, the third illuminator 76, and the fourth illuminator 78 is referred to as "each illuminator" as appropriate. As illustrated in FIG. 3, the illumination device 3 is configured such that the reflective plate 80, the second light guide plate 54, the first light guide plate 34, the diffusion sheet 32, and the prism sheet 30 are arranged in this order along the Z-axis direction.

The prism sheet 30 is an optical sheet for controlling directions in which light that has entered the prism sheet 30 exits therefrom. As illustrated in FIG. 3, the prism sheet 30 is arranged facing the display panel 2. The prism sheet 30 is, for example, an acrylic-based resin film that has a prism formed on a surface thereof. The diffusion sheet 32 is an optical film for diffusing light incident on the diffusion sheet 32. The diffusion sheet 32 is, for example, an acrylic resin film that has random irregularities formed on a surface thereof.

The first light guide plate 34 is, for example, a polycarbonate or acrylic plate member. As illustrated in FIG. 3, the first light guide plate 34 extends in the X-axis direction and Y-axis direction (along an X-Y plane) and has a first upper surface 36 and a first lower surface 38 opposite to the first upper surface 36. The first light guide plate 34 also has a first side surface 40 perpendicular to the Y-axis direction and a second side surface 42 opposite to the first side surface 40. As illustrated in FIG. 3, the first light guide plate 34 has the first upper surface 36 arranged facing the diffusion sheet 32.

As illustrated in FIG. 3, the first lower surface 38 has a first scattering portion 44 and a second scattering portion 46 arranged therein. Each of the first scattering portion 44 and the second scattering portion 46 is provided, for example, in the form of a plurality of grooves formed on the first over surface 38. Each of the first scattering portion 44 and the second scattering portion 46 illustrated in FIG. 3 has triangular grooves as viewed from the X-axis direction. The first scattering portion 44 is formed so as to have the grooves deeper in locations farther from the first side surface 40. The second scattering portion 46 is formed so as to have the grooves deeper in locations farther from the second side surface 42. A first region 48 illustrated in FIG. 4 with hatched lines is a region in the first lower surface 38 that has neither the first scattering portion 44 nor the second scattering portion 46 formed therein. A second region 50 illustrated in FIG. 4 is a region in the first lower surface 38 that is located between the first scattering portion 44 and the second scattering portion 46. A third region 52 illustrated in FIG. 4 is a region in the first lower surface 38 that is located between the second side surface 42 and the second scattering portion 46.

The second light guide plate 54 is, for example, a polycarbonate or acrylic plate member. As illustrated in FIG. 1 and FIG. 3, the second light guide plate 54 has the same external dimensions as the first light guide plate 34. The second light guide plate 54 extends in the X-axis direction and Y-axis direction (along the X-Y plane) and has a second upper surface 56 and a second lower surface 58 opposite to the second upper surface 56. The second light guide plate 54 also has a third side surface 60 perpendicular to the Y-axis direction and a fourth side surface 62 opposite to the third side surface 60. As illustrated in FIG. 3, the second light guide plate 54 has the second upper surface 56 arranged facing the first lower surface 38.

As illustrated in FIG. 3, the second lower surface 58 has a third scattering portion 64 and a fourth scattering portion 66 arranged therein. Each of the third scattering portion 64 and the fourth scattering portion 66 is provided, for example, in the form of a plurality of grooves formed on the second lower surface 58. Each of the grooves of the third scattering portion 64 and the fourth scattering portion 66 has a triangular shape as viewed from the X-axis direction. The third scattering portion 64 is formed so as to have the grooves deeper in locations farther from the third side surface 60. The fourth scattering portion 66 is formed so as to have the grooves deeper in locations farther from the fourth side surface 62.

The explanatory diagram illustrated in FIG. 5 represents the positional relation between the first scattering portion 44, the second scattering portion 46, the third scattering portion 64, and the fourth scattering portion 66. As illustrated in FIG. 4 and FIG. 5, the third scattering portion 64 is arranged overlapping the second region 50 in the X-axis direction and Y-axis direction (in an X-Y plane view), that is, as viewed from the Z-axis direction. The fourth scattering portion 66 is arranged overlapping the third region 52 as viewed from the Z-axis direction. As illustrated in FIG. 5, as viewed from the Z-axis direction, the third scattering portion 64 is arranged such that one end thereof in the Y-axis direction overlaps the first scattering portion 44 along the X-axis direction. As viewed from the Z-axis direction, the third scattering portion 64 is arranged such that the other end thereof in the Y-axis direction overlaps the second scattering portion 46 along the X-axis direction. As viewed from the Z-axis direction, the fourth scattering portion 66 is arranged such that one end thereof in the Y-axis direction overlaps the second scattering portion 46 along the X-axis direction.

As illustrated in FIG. 1 and FIG. 2, the first illuminator 70 includes light source elements 70A, 70B, 70C, 70D, 70E, 70F, and 70G arranged along the first side surface 40. The second illuminator 74 includes light source elements 74A, 74B, 74C, 74D, 74E, 74F, and 74G arranged along the second side surface 42. The third illuminator 76 includes light source elements 76A, 76B, 76C, 76D, 76E, 76F, and 76G arranged along the third side surface 60. The fourth illuminator 78 includes light source elements 78A, 78B, 78C, 78D, 78E, 78F, and 78G arranged along the fourth side surface 62. The light source elements included in each illuminator are, for example, light emitting diodes (LED). The number of light source elements included in each illuminator is not particularly limited.

First incoming light L1 illustrated in FIG. 2 is light emitted by the first illuminator 70 and entering the inside of the first light guide plate 34 from the first side surface 40. Second incoming light L2 illustrated in FIG. 2 is light emitted by the second illuminator 74 and entering the inside of the first light guide plate 34 from the second side surface 42. Third incoming light L3 illustrated in FIG. 2 is light emitted by the third illuminator 76 and entering the inside of the second light guide plate 54 from the third side surface 60. Fourth incoming light L4 illustrated in FIG. 3 is light emitted by the fourth illuminator 78 and entering the inside of the second light guide plate 54 from the fourth side surface 62.

The reflective plate 80 is arranged facing the second lower surface 58 of the second light guide plate 54. The reflective plate 80 is a member reflecting light that has leaked from the second lower surface 58 and bring the light into the second light guide plate 54. The reflective plate 80 is made of, for example, foamed polyethylene terephthalate (PET). The reflective plate 80 may be made of, for example, an evaporated silver film, a multilayered reflective film, or white PET.

The FPCs 82, 84, 86, and 88 illustrated in FIG. 3 are flexible printed circuit boards. A flexible printed circuit board is, for example, a board obtained by bonding conductive foil to a polyimide film having flexibility. As illustrated in FIG. 2, the FPC 82 couples a light source driver 98 and the first illuminator 70 to each other. The FPC 84 couples the light source driver 98 and the second illuminator 74 to each other. The FPC 86 couples the light source driver 98 and the third illuminator 76 to each other. The FPC 88 couples the light source driver 98 and the fourth illuminator 78 to each other.

The FPC 82 and the FPC 86 are arranged in positions facing each other in the Z-axis direction with the first illuminator 70 and the third illuminator 76 in between. Thus, the first illuminator 70 and the third illuminator 76 can be arranged closer to each other. The FPC 84 and the FPC 88 are arranged in positions facing each other in the Z-axis direction with the second illuminator 74 and the fourth illuminator 78 in between. Thus, the second illuminator 74 and the fourth illuminator 78 can be arranged closer to each other. Such a configuration allows the first light guide plate 34 and the second light guide plate 54 to be arranged closer to each other. Consequently, the illumination device 3 can be thinner.

FIG. 6 is an explanatory diagram illustrating regions of the first upper surface 36 from which light emitted by the individual light source elements exits. With reference to FIG. 2, FIG. 3, and FIG. 6, regions of the first upper surface 36 from which light emitted by the individual light source elements exits are described. A light output region I illustrated in FIG. 6 is a region of the first upper surface 36 from which light emitted by the individual light source elements exits. As illustrated in FIG. 6, the light output region I is divided in the X-axis direction into a first row $R_1$, a second row $R_2$, a third row $R_3$, a fourth row $R_4$, a fifth row $R_5$, a sixth row $R_6$, and a seventh row $R_7$. The light output region I is divided in the Y-axis direction into a first column $C_1$, a second column $C_2$, a third column $C_3$, and a fourth column $C_4$. A part of the light output region I that is located in the n-th row and the m-th column is referred to as a light output region $I_{nm}$.

The first column $C_1$ of the light output region. I is a region overlapping the first scattering portion 44 as viewed from the Z-axis direction. The second column $C_2$ of the light output region I is a region overlapping the third scattering portion 64 as viewed from the Z-axis direction. The third column $C_3$ of the light output region I is a region overlapping the second scattering portion 46 as viewed from the Z-axis direction. The fourth column $C_4$ of the light output region I is a region overlapping the fourth scattering portion 66 as viewed from the Z-axis direction.

As illustrated in FIG. 3, the first incoming light L1 emitted by the first illuminator 70 is incident on the first scattering portion 44 via the first side surface 40. The first incoming light L1 is scattered by the first scattering portion 44, so that first exiting light L5 exits from the first column $C_1$ in the light output region I illustrated in FIG. 6. The first row the second row $R_2$, the third row $R_3$, the fourth row $R_4$, the fifth row $R_5$, the sixth row $R_6$, and the seventh row $R_7$ illustrated in FIG. 6 correspond in X-axis direction to respective positions in which the light source elements 70A, 70B, 70C, 70D, 70E, 70F, and 70G included in the first illuminator 70 are arranged. Therefore, light emitted by the light source element 70A exits from the light output region $I_{11}$. Likewise, light emitted by the light source element 70B exits from the light output region $I_{21}$. Likewise, light emitted by the light source elements 70C, 70D, 70E, 70F, and 70G exits from the respective light output regions in the first column $C_1$ the positions of which correspond to these respective light source elements in the X-axis direction.

As illustrated in FIG. 3, the second incoming light L2 emitted by the second illuminator 74 is incident on the second scattering portion 46 via the second side surface 42. The second incoming light L2 is scattered by the second scattering portion 46, so that second exiting light L6 exits from the third column $C_3$ in the light output region I illustrated in FIG. 6. As in the case with the first illuminator 70, light emitted by the light source elements 74A to 74G exits from the respective light output regions in the third column $C_3$ the positions of which correspond to the respective light source elements in the X-axis direction.

As illustrated in FIG. 3, the third incoming light L3 emitted by the third illuminator 76 is incident on the third scattering portion 64 via the third side surface 60. The third incoming light L3 is scattered by the third scattering portion 64, so that third exiting light L7 exits from the second column $C_2$ in the light output region I illustrated in FIG. 6. As in the case with the first illuminator 70, light emitted by the light source elements 76A to 76G exits from the respective light output regions in the second column $C_2$ the positions of which correspond to the respective light source elements in the X-axis direction.

As illustrated in FIG. 3, the fourth incoming light L4 emitted by the fourth illuminator 78 is incident on the fourth scattering portion 66 via the fourth side surface 62. The fourth incoming light L4 is scattered by the fourth scattering portion 66, so that fourth exiting light L8 exits from the fourth column $C_4$ in the light output region I illustrated in FIG. 6. As in the case with the first illuminator 70, light emitted by the light source elements 78A to 78G exits from the respective light output regions in the fourth column $C_4$ the positions of which correspond to the respective light source elements in the X-axis direction.

As illustrated in FIG. 3, the first exiting light L5, the second exiting light L6, the third exiting light L7, and the fourth exiting light L8 are diffused by the diffusion sheet 32. Diffused light obtained from the diffusion by the diffusion sheet 32 enters the display panel 2 with the directivity thereof being controlled by the prism sheet 30.

Next, examples of methods for driving the display panel 2 and the illumination device 3 are described with reference to FIG. 2. Driving of the display panel 2 and the illumination device 3 is controlled by the image signal controller 90, the gradation controller 92, the gate line driver 94, the data line driver 96, and the light source driver 98 illustrated in FIG. 2.

The image signal controller 90 generates an image control signal VCS and a light output control signal LCS, based on an image signal VS input from the outside. The image signal VS contains gradation information regarding the gradation values for the respective sub-pixels PX. Hereinafter, a gradation value related to gradation information contained in the image signal VS is referred to as a first gradation value. The first gradation value indicates, for example, a value between 0 and 255.

The image control signal VCS is a signal for determining the gradation values to be assigned to the sub-pixels PX in the display panel 2. The image control signal VCS contains gradation information regarding the gradation values for the respective sub-pixels PX. Hereinafter, a gradation value related to gradation information contained in the image control signal VCS is referred to as a second gradation value. The second gradation value indicates, for example, a value between 0 and 255. The image signal controller 90 performs, for example, correction processing, such as gamma correction and stretching, on the first gradation value, thereby setting up the second gradation value that is different from the first gradation value.

The gradation controller 92 generates a horizontal drive signal HDS and a vertical drive signal VDS, based on the image control signal VCS. The gate line driver 94 selects, based on the horizontal drive signal HDS, the gate lines 21 in the display panel 2 during each vertical scan period. The gate lines may be selected in any order. For example, the gate lines 21 are sequentially selected in the following order: S1, S2, S3, . . . , and Sm. The data line driver 96 supplies, based on the vertical drive signal VDS, gradation signals to the data lines 22 in the display panel 2 during each horizontal scan period, the gradation signals corresponding to the second gradation values for the respective sub-pixels PX. The display panel 2 thus displays an image of one frame.

The light output control signal LCS contains information on the light quantity of light emitted from each of the light source elements. The light output control signal LCS further contains information on a timing at which each of the light source elements emits light. The image signal controller 90 determines the light quantities of the light source elements in each of the illuminators in accordance with brightness values of images to be displayed on respective display portions in the display panel 2 corresponding to the light output regions $I_{nm}$. Each of the brightness value may be, for example, an average of the first gradation values for the sub-pixels PX in the corresponding display portion. Specifically, the image signal controller 90 determines the light output control signals LCS so that the light quantities of portions in which darker images are displayed can be smaller. The image signal controller 90 sets up the light output control signals LCS so that the light quantities of portions in which brighter images are displayed can be larger.

During each horizontal scan period, based on the light output control signals LCS, the light source driver 98 causes the light source elements to emit light with light quantities assigned to the respective light source elements. Thus, the illumination device 3 can emit light toward the display panel 2 with light quantities according to the brightness values of images to be displayed on the respective display portions of the display panel 2. The illumination device 3 therefore can have a lower light quantity of a portion in the display panel 2 on which a darker image is displayed. The illumination device 3 therefore can have a higher light quantity of a portion in the display panel 2 on which a brighter image is displayed. As a result, the display panel 2 allows for reduced power consumption and improved contrast.

In the illumination device 3 according to the first embodiment, the first scattering portion 44 is arranged between the first side surface 40 and the second scattering portion 46, as illustrated in FIG. 3. In the illumination device 3, the third scattering portion 64 is arranged overlapping the second region 50 as viewed from the Z-axis direction, as illustrated in FIG. 4 and FIG. 5. In the illumination device 3, the fourth scattering portion 66 is arranged overlapping the third region 52 as viewed from the Z-axis direction. Therefore, each of the first scattering portion 44, the second scattering portion 46, the third scattering portion 64, and the fourth scattering portion 66 has a region not overlapping the others as viewed from the Z-axis direction. Thus configured, each of the first scattering portion 44, the second scattering portion 46, the third scattering portion 64, and the fourth scattering portion 66 scatters light incident on the scattering portion and causes the light to exit from the first upper surface 36. Therefore, the first scattering portion 44, the second scattering portion 46, the third scattering portion 64, and the fourth scattering portion 66 can cause light to exit from different regions of the first upper surface 36.

The respective light source elements in the first illuminator 70 emit light to the first scattering portion 44 from different positions along the X-axis direction. The respective light source elements in the second illuminator 74 emit light to the second scattering portion 46 from different positions along the X-axis direction. The respective light source elements in the third illuminator 76 emit light to the third scattering portion 64 from different positions along the X-axis direction. The respective light source elements in the fourth illuminator 78 emit light to the fourth scattering portion 66 from different positions along the X-axis direction. Therefore, the display device 1 can adjust the light quantity of light exiting from the first upper surface 36 for each of the regions of the first upper surface 36 by controlling the light quantity of light emitted from each of the light source elements. That is, the display device 1 is capable of executing local dimming control.

Furthermore, the illumination device 3 has the first scattering portion 44 and the second scattering portion 46 arranged on the first lower surface 38 of the first light guide plate 34. The illumination device 3 also has the third scattering portion 64 and the fourth scattering portion 66 arranged on the second lower surface 58 of the second light guide plate 54. Therefore, the illumination device 3 makes it possible to divide the light output region I into four in the Y direction by using only two light guide plates. That is, the illumination device 3 allows for local dimming control at a high resolution with the thickness thereof reduced in the Z-axis direction.

As illustrated in FIG. 5, as viewed from the Z-axis direction, the third scattering portion 64 of the illumination device 3 according to the first embodiment is arranged such that one end thereof in the Y-axis direction overlaps the first scattering portion 44 along the X-axis direction. According to this arrangement, the first exiting light L5 scattered by the first scattering portion 44 and exiting from the first upper surface 36 overlaps the third exiting light L7 scattered by the third scattering portion 64 and exiting from the first upper surface 36. The third scattering portion 64 is arranged such that the other end thereof in the Y-axis direction overlaps the second scattering portion 46 along the X-axis direction. According to this arrangement, the second exiting light L6 scattered by the second scattering portion 46 and exiting from the first upper surface 36 overlaps the third exiting light L7. As viewed from the Z-axis direction, the fourth scattering portion 66 is arranged such that one end thereof in the Y-axis direction overlaps the second scattering portion 46 along the X-axis direction. According to this arrangement, the second exiting light L6 overlaps the fourth exiting light L8 scattered by the fourth scattering portion 66 and exiting from the first upper surface 36. Consequently, the illumination device 3 can prevent reduction in luminance at the boundaries of the respective scattering portions. Furthermore, unlike a case where each of the scattering portions does not overlap the others, reduction in luminance at the boundaries of the respective scattering portions can be prevented when the first light guide plate 34 and the second light guide plate 54 are displaced against each other. Therefore, the illumination device 3 can have a larger tolerable size of displacement between the first light guide plate 34 and the second light guide plate 54. As a result, alignment of the first light guide plate 34 and the second light guide plate 54 can be facilitated.

In the illumination device 3 according to the first embodiment, the grooves of the first scattering portion 44 are deeper in locations farther from the first side surface 40 as illustrated in FIG. 3. Light incident on the first scattering portion 44 is scattered more by deeper grooves thereof. Therefore, the first scattering portion 44 tends to scatter light less in locations closer to the first side surface 40. The first scattering portion 44 tends to scatter light more in locations farther from the first side surface 40. The first incoming light L1 emitted from the first illuminator 70 is incident on the first scattering portion 44 through the first side surface 40. Thus, the first scattering portion 44 scatters light more in a region farther from the first side surface 40 (a region where the light intensity of the first incoming light L1 is weaker) than in a region closer to the first side surface 40 (a region where the light intensity of the first incoming light L1 is stronger). Therefore, the first scattering portion 44 can cause light to evenly exit from the first upper surface 36. The grooves of the second scattering portion 46 are deeper in locations farther from the second side surface 42. The grooves of the third scattering portion 64 are deeper in locations farther from the third side surface 60. The grooves of the fourth scattering portion 66 are deeper in locations farther from the fourth side surface 62. Thus, the second scattering portion 46, the third scattering portion 64, and the fourth scattering portion 66 enable light to evenly exit from the first upper surface 36 in the same manner as the first scattering portion 44.

In the above example, each of the first scattering portion 44, the second scattering portion 46, the third scattering portion 64, and the fourth scattering portion 66 is provided in the form of grooves formed on the light guide plates. However, the configuration of the scattering portions is not limited thereto. Each of the first scattering portion 44, the second scattering portion 46, the third scattering portion 64, and the fourth scattering portion 66 may be any member that can scatter light. Each of the first scattering portion 44, the second scattering portion 46, the third scattering portion 64, and the fourth scattering portion 66 may be provided, for example, in the form of a plurality of dots printed on the lower surfaces of the light guide plates. In such a case, the density of dots formed in each of the scattering portions may be adjusted so that the light quantities of light exiting from the first upper surface 36 can be uniform.

In the above example, the third scattering portion 64 is arranged overlapping the second region 50 as viewed from the Z-axis direction. However, the third scattering portion 64 is not limited thereto. The fourth scattering portion 66 is arranged overlapping the third region 52 as viewed from the Z-axis direction. However, the fourth scattering portion 66 is not limited thereto. It is only required that each of the third scattering portion 64 and the fourth scattering portion 66 is arranged in such a manner that at least a part thereof overlaps the first region 48 as viewed from the Z-axis direction. This configuration allows each of the first scattering portion 44, the second scattering portion 46, the third scattering portion 64, and the fourth scattering portion 66 to have at least a part not overlapping the others as viewed from the Z-axis direction. Thus, the illumination device 3 can cause the first exiting light L5, the second exiting light L6, the third exiting light L7, and the fourth exiting light L8 to exit from different regions of the first upper surface 36.

In the above example, the illumination device 3 includes the first light guide plate 34 and the second light guide plate 54. However, the configuration of the illumination device 3 is not limited thereto. The illumination device 3 may include three or more light guide plates each having at least one scattering portion and may include a plurality of illuminators that causes light to enter the individual light guide plates through side surfaces thereof. In such a case, the scattering portions may be arranged in such a manner that each of the scattering portions has at least a part not overlapping the others as viewed from the Z-axis direction. This configuration makes it possible to implement local dimming control as in the case with the illumination device 3 according to the first embodiment.

Second Embodiment

Figure 7:
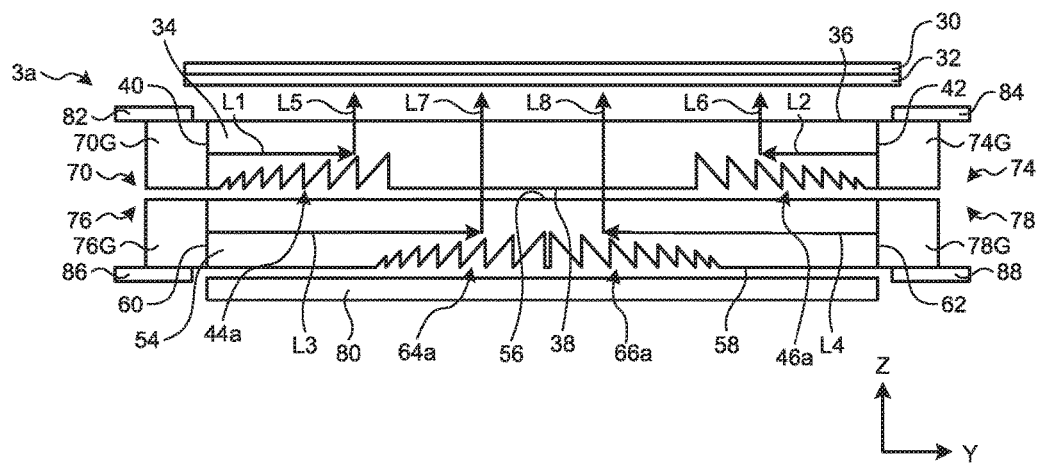
FIG. 7 is a schematic view on an arrow along the X-axis direction of an illumination device according to a second embodiment.
Figure 8:
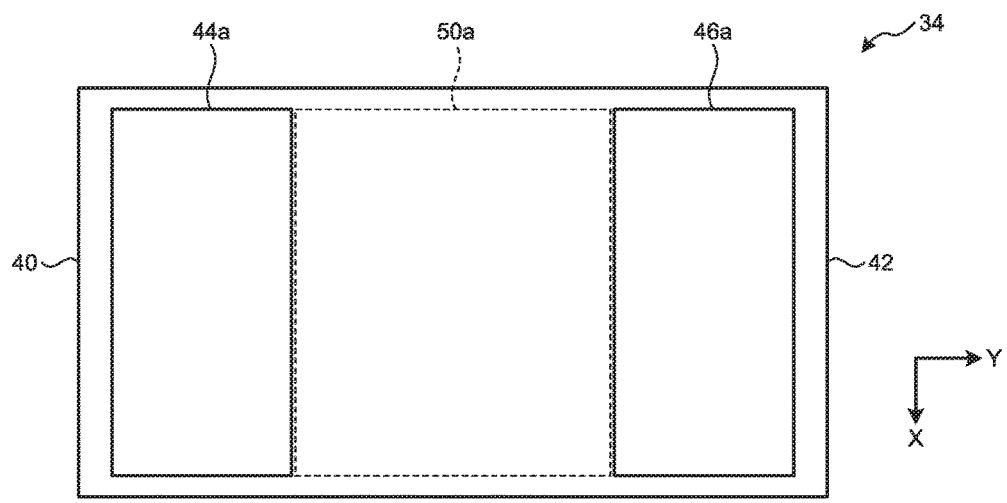
FIG. 8 is a plan view of a first light guide plate according to the second embodiment.
Figure 9:
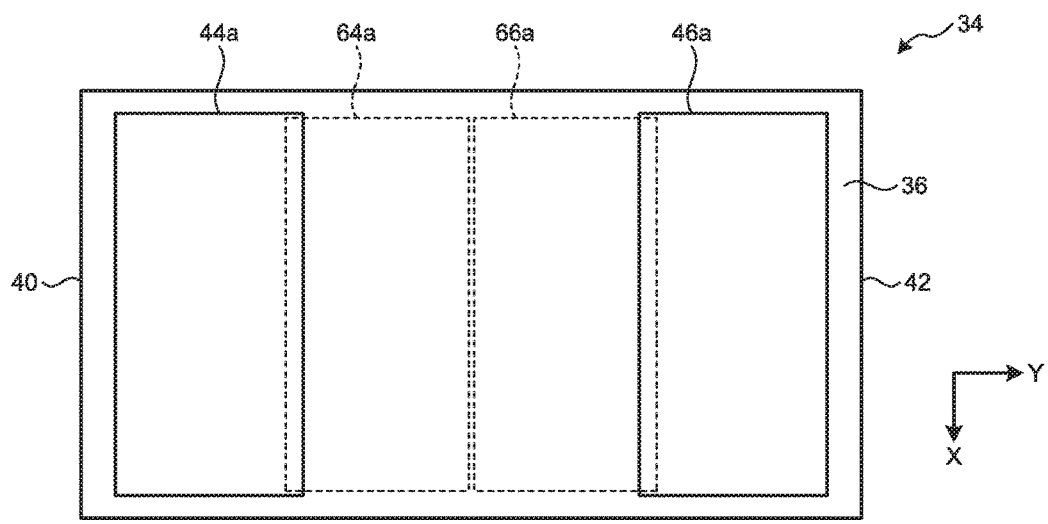
FIG. 9 is an explanatory diagram illustrating the positional relation between a first scattering portion, a second scattering portion, a third scattering portion, and a fourth scattering portion in the illumination device according to the second embodiment.

FIG. 7 is a schematic view on an arrow along the X-axis direction of an illumination device 3a according to a second embodiment. FIG. 8 is a plan view of a first light guide plate 34 according to the second embodiment. FIG. 9 is an explanatory diagram illustrating the positional relation between a first scattering portion, a second scattering portion, a third scattering portion, and a fourth scattering portion in the illumination device 3a according to the second embodiment. The following describes a display device 1a according to the second embodiment with reference to FIG. 7 to FIG. 9. The same components as those of the display device 1 according to the first embodiment are assigned the same reference signs, and detailed description thereof is omitted.

The display device 1a is identical to the display device 1 except that the illumination device 3a is included in place of the illumination device 3. The illumination device 3a is identical to the illumination device 3 except that a first scattering portion 44a, a second scattering portion 46a, a third scattering portion 64a, and a fourth scattering portion 66a are included in place of the first scattering portion 44, the second scattering portion 46, the third scattering portion 64, and the fourth scattering portion 66.

A first region 50a illustrated in FIG. 8 is a region in the first lower surface 38 that is located between the first scattering portion 44a and the second scattering portion 46a. As illustrated in FIG. 8 and FIG. 9, the third scattering portion 64a and the fourth scattering portion 66a are arranged overlapping the first region 50a in the X-axis direction and Y-axis direction (that is, as viewed from the Z-axis direction). As illustrated in FIG. 9, as viewed from the Z-axis direction, the third scattering portion 64a is arranged such that one end thereof in the Y-axis direction overlaps the first scattering portion 44a along the X-axis direction. As viewed from the Z-axis direction, the fourth scattering portion 66a is arranged such that one end thereof in the Y-axis direction overlaps the second scattering portion 46a along the X-axis direction. This configuration prevents reduction in luminance at the boundaries of the respective scattering portions as in the case with the illumination device 3. This configuration also facilitates alignment of the first light guide plate 34 and the second light guide plate 54 as in the case with the illumination device 3.

Third Embodiment

Figure 10:
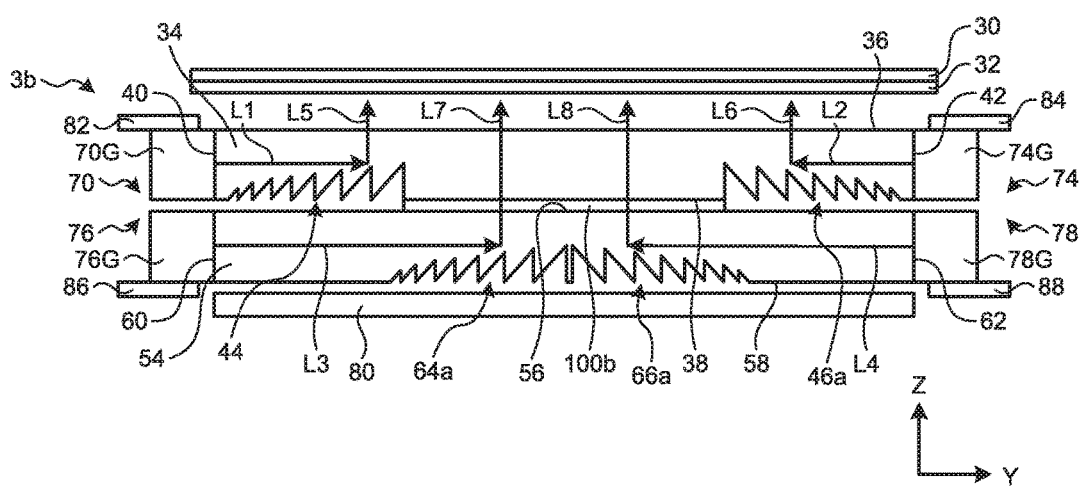
FIG. 10 is a schematic view on an arrow along the X-axis direction of an illumination device according to a third embodiment.

FIG. 10 is a schematic view on an arrow along the X-axis direction of an illumination device 3b according to a third embodiment. The following describes a display device 1b according to the third embodiment with reference to FIG. 8 to FIG. 10. The same components as those of the display device 1a according to the second embodiment are assigned the same reference signs, and detailed description thereof is omitted.

The display device 1b is identical to the display device 1a except that the illumination device 3b is included in place of the illumination device 3a. The illumination device 3b is identical to the illumination device 3a except that a coupler 100b is further included.

As illustrated in FIG. 10, the coupler 100b is a coupling member optically coupling the first region 50a (refer to FIG. 8) with the second upper surface 56. As used in this embodiment, "optically coupled" means that two members are coupled to each other by a material that has a refractive index close to those of the two members. The third scattering portion 64a and the fourth scattering portion 66a overlap the first region 50a as viewed from the Z-axis direction. Such a configuration allows the illumination device 3b to prevent the total reflection of light scattered by the third scattering portion 64a, on the second upper surface 56. Such a configuration also allows the illumination device 3b to prevent the total reflection of light scattered by the fourth scattering portion 66a, on the second upper surface 56. Therefore, the illumination device 3b more efficiently enables light scattered by the third scattering portion 64a and the fourth scattering portion 66a to exit from the first upper surface 36. The coupler 100b may be any optical bonding member that has a refractive index close to the refractive indexes of the first light guide plate 34 and the second light guide plate 54. The coupler 100b is, for example, an optical clear adhesive (OCA). The coupler 100b may alternatively be, for example, an optical clear resin (OCR) or an acrylic optical transparent resin.

Fourth Embodiment

Figure 11:
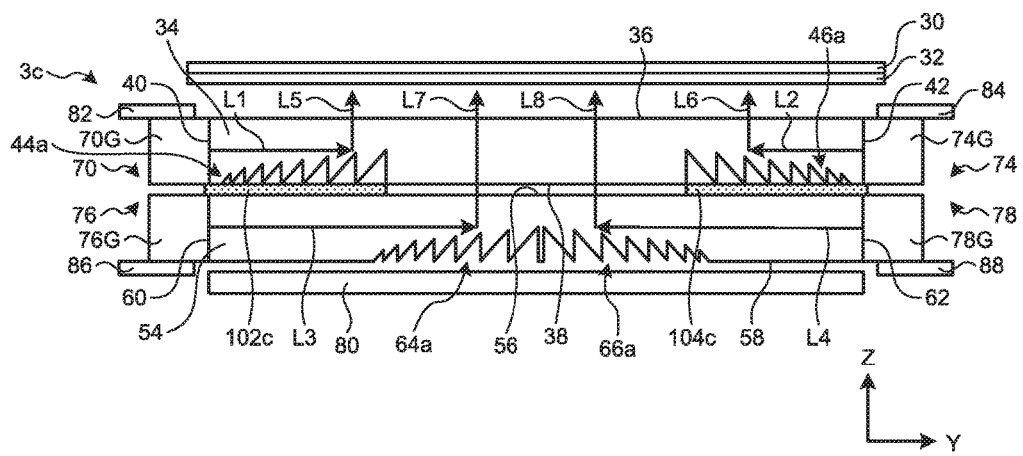
FIG. 11 is a schematic view on an arrow along the X-axis direction of an illumination device according to a fourth embodiment.

FIG. 11 is a schematic view on an arrow along the X-axis direction of an illumination device 3c according to a fourth embodiment. The following describes a display device 1c according to the fourth embodiment with reference to FIG. 11. The same components as those of the display device 1a according to the second embodiment are assigned the same reference signs, and detailed description thereof is omitted.

The display device 1c is identical to the display device 1a except that the illumination device 3c is included in place of the illumination device 3a. The illumination device 3c is identical to the illumination device 3a except that reflective plates 102c and 104c are further included.

As illustrated in FIG. 11, the reflective plate 102c is identical to the reflective plate 80 except that the reflective plate 102c is arranged between the first scattering portion 44a and the second upper surface 56. The reflective plate 104c is identical to the reflective plate 80 except that the reflective plate 104c is arranged between the second scattering portion 46a and the second upper surface 56. This configuration enables the reflective plate 102c to reflect light that leaks toward the second light guide plate 54 after entering the first scattering portion 44a. Thus, the first incoming light L1 can be efficiently scattered by the first scattering portion 44a. The reflective plate 104c is also enabled to reflect light that leaks toward the second light guide plate 54 after entering the second scattering portion 46a. Thus, the second incoming light L2 can be efficiently scattered by the second scattering portion 46a.

Furthermore, the reflective plate 102c is enabled to reflect light traveling to the first scattering portion 44a directly from the inside of the second light guide plate 54. Thus, the third incoming light L3 can be efficiently scattered by the third scattering portion 64a. The reflective plate 104c is also enabled to reflect light traveling to the second scattering portion 46a directly from the inside of the second light guide plate 54. Thus, the fourth incoming light L4 can be efficiently scattered by the fourth scattering portion 66a.

Fifth Embodiment

Figure 12:
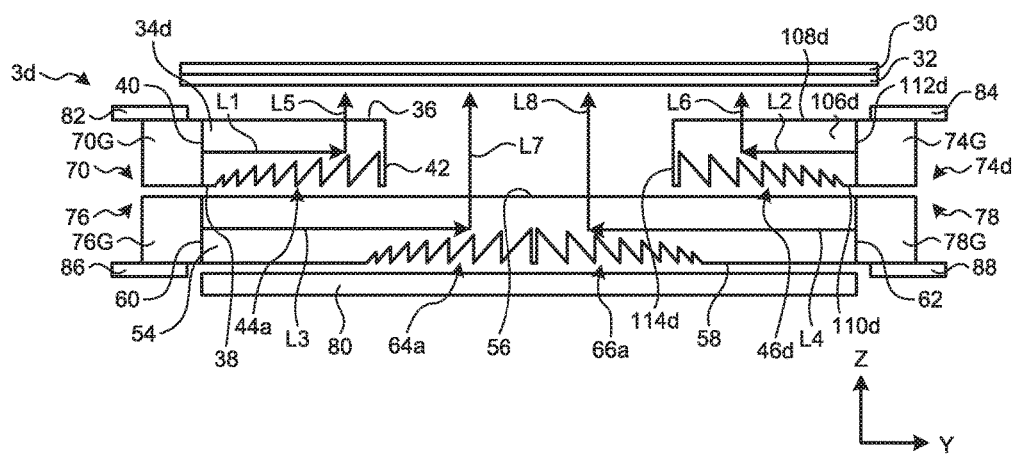
FIG. 12 is a schematic view on an arrow along the X-axis direction of an illumination device according to a fifth embodiment.
Figure 13:
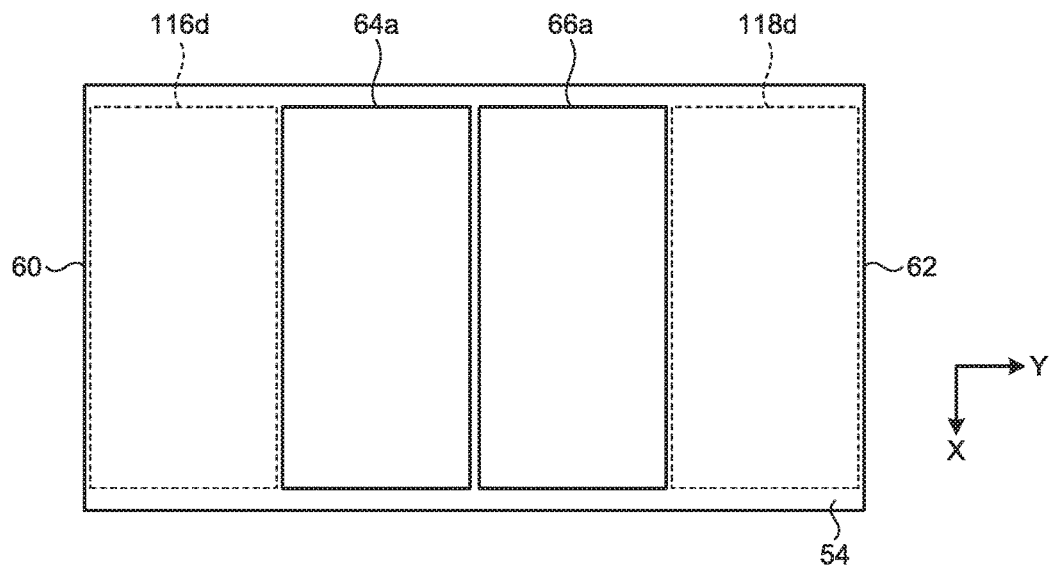
FIG. 13 is a plan view of a second light guide plate according to the fifth embodiment.
Figure 14:
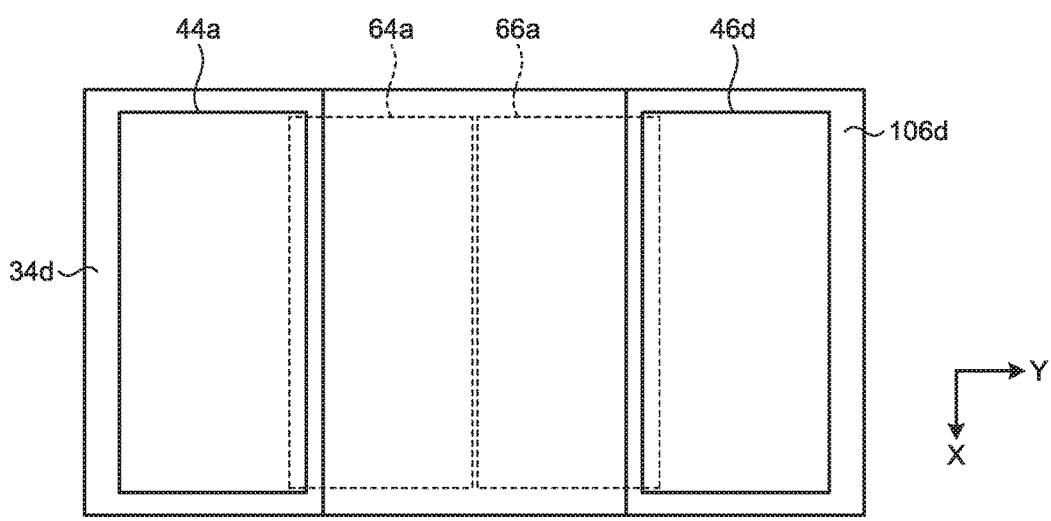
FIG. 14 is an explanatory diagram illustrating the positional relation between a first scattering portion, a second scattering portion, a third scattering portion, and a fourth scattering portion is the illumination device according to the fifth embodiment.

FIG. 12 is a schematic view on an arrow along the X-axis direction of an illumination device 3d according to a fifth embodiment. FIG. 13 is a plan view of a second light guide plate 54 according to the fifth embodiment. FIG. 14 is an explanatory diagram illustrating the positional relation between a first scattering portion, a second scattering portion, a third scattering portion, and a fourth scattering portion in the illumination device 3d according to the fifth embodiment. The following describes a display device 1d according to the fifth embodiment with reference to FIG. 12 to FIG. 14. The same components as those of the display device 1a according to the second embodiment are assigned the same reference signs, and detailed description thereof is omitted.

The display device 1d is identical to the display device 1a except that the illumination device 3d is included in place of the illumination device 3a. The illumination device 3d differs from the illumination device 3a by including a first light guide plate 34d and a third light guide plate 106d in place of the first light guide plate 34. The illumination device 3d further differs from the illumination device 3a by including a second illuminator 74d in place of the second illuminator 74.

As illustrated in FIG. 12, the first light guide plate 34d differs from the first light guide plate 34 by not including the second scattering portion 46a. The third light guide plate 106d extends in the X-axis direction and Y-axis direction (along the X-Y plane) and has a third upper surface 108d and a third lower surface 110d opposite to the third upper surface 108d. The third light guide plate 106d has a fifth side surface 112d and a sixth side surface 114d opposite to the fifth side surface 112d. The third light guide plate 106d has the third upper surface 108d arranged facing the diffusion sheet 32. The third light guide plate 106d has the sixth side surface 114*d* arranged facing the second side surface 42. The third lower surface 110*d* has a second scattering portion 46*d* arranged therein. The second scattering portion 46*d* is identical to the second scattering portion 46*a* except that the second scattering portion 46*d* is arranged in the third lower surface 110*d*.

The second illuminator 74*d* is identical to the second illuminator 74 except that the second illuminator 74*d* has light source elements thereof arranged along the fifth side surface 112*d* instead of the second side surface 42.

The plan view illustrated in FIG. 13 is a plan view of the second light guide plate 54 as viewed from the Z-axis direction. A fourth region 116*d* illustrated FIG. 13 is a region in the second lower surface 58 that is located between the third scattering portion 64*a* and the third side surface 60. A fifth region 118*d* illustrated in FIG. 13 is a region in the second lower surface 58 that is located between the fourth scattering portion 66*a* and the fourth side surface 62.

As illustrated in FIG. 13 and FIG. 14, the first scattering portion 44*a* overlaps the fourth region 116*d* in the X-axis direction and Y-axis direction (that is, as viewed from the Z-axis direction). The second scattering portion 46*d* overlaps the fifth region 118*d* as viewed from the Z-axis direction. As illustrated in FIG. 14, each of the third scattering portion 64*a* and the fourth scattering portion 66*a* is arranged so as to have at least a part not overlapping both of the first light guide plate 34*d* and the third light guide plate 106*d*. This configuration enables light scatted by the third scattering portion 64*a* to enter the display panel 2 without interference from the first light guide plate 34*d* and the third light guide plate 106*d*. Thus, light scattered by the third scattering portion 64*a* is efficiently enabled to enter the display panel 2. Light scatted by the fourth scattering portion 66*a* is enabled to enter the display panel 2 without interference from the first light guide plate 34*d* and the third light guide plate 106*d*. This, light scatted by the fourth scattering portion 66*a* is efficiently caused to enter the display panel 2. Consequently, the illumination device 3*d* can emit light having necessary light quantities to the display panel 2 with less power consumption.

Sixth Embodiment

Figure 15:
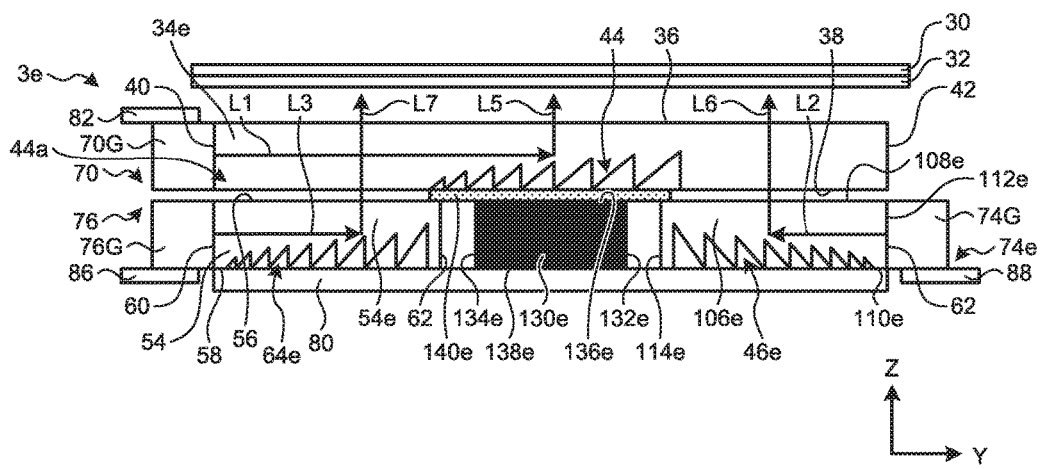
FIG. 15 is a schematic view on an arrow along the X-axis direction of an illumination device according to a sixth embodiment.
Figure 16:
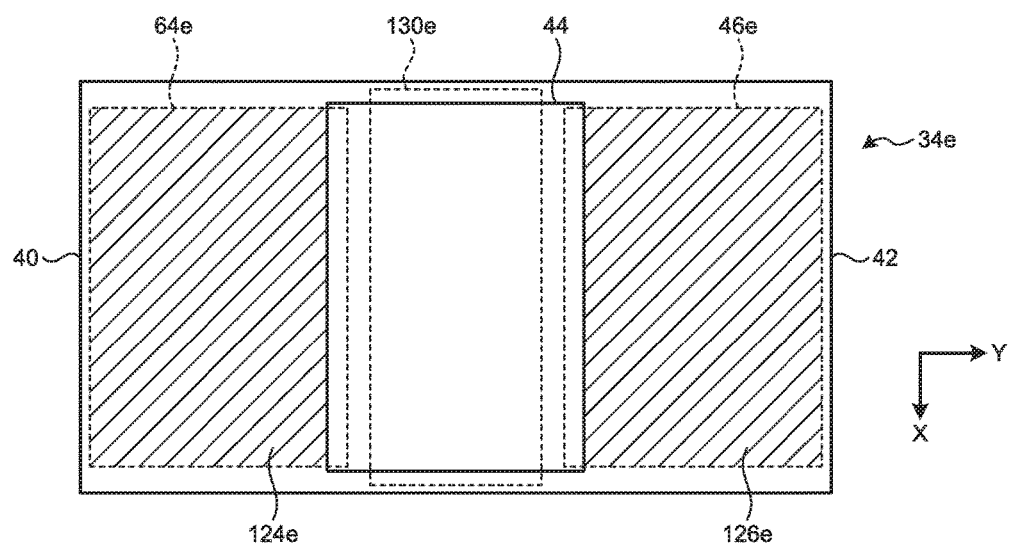
FIG. 16 is an explanatory diagram illustrating the positional relation between a first scattering portion, a second scattering portion, and a third scattering portion in the illumination device according to the sixth embodiment.

FIG. 15 is a schematic view on an arrow along the X-axis direction of an illumination device 3*e* according to a sixth embodiment. FIG. 16 is an explanatory diagram illustrating the positional relation between a first scattering portion, a second scattering portion, and a third scattering portion in the illumination device 3*e* according to the sixth embodiment. The following describes a display device 1*e* according to the sixth embodiment with reference to FIG. 15 and FIG. 16. The same components as those of the display device 1 according to the first embodiment are assigned the same reference signs, and detailed description thereof is omitted.

As illustrated in FIG. 15, the display device 1*e* is identical to the display device 1 except that the illumination device 3*e* is included in place of the illumination device 3. The illumination device 3*e* differs from the illumination device 3 by including a first light guide plate 34*e* in place of the first light guide plate 34. The illumination device 3*e* further differs from the illumination device 3 by including a second light guide plate 54*e* in place of the second light guide plate 54. The illumination device 3*e* further differs from the illumination device 3 by including a second illuminator 74*e* in place of the second illuminator 74 and the fourth illuminator 78. The illumination device 3*e* further differs from the illumination device 3 by including a third light guide plate 106*e*, a light blocking portion 130*e*, and a reflective plate 140*e*.

The first light guide plate 34*e* differs from the first light guide plate 34 by not including the second scattering portion 46. The second light guide plate 54*e* differs from the second light guide plate 54 by including a third scattering portion 64*e* in place of the third scattering portion 64 and the fourth scattering portion 66. The second light guide plate 54*e* differs from the second light guide plate 54 by having the second lower surface 58 arranged in contact with the reflective plate 80.

The third light guide plate 106*e* has a third upper surface 108*e* and a third lower surface 110*e* opposite to the third upper surface 108*e*. The third light guide plate 106*e* has a fifth side surface 112*e* and a sixth side surface 114*e* opposite to the fifth side surface 112*e*. The third light guide plate 106*e* has the third upper surface 108*e* arranged facing the first lower surface 38. The third light guide plate 106*e* has the sixth side surface 114*e* arranged facing the fourth side surface 62. The third light guide plate 106*e* has the third lower surface 110*e* arranged in contact with the reflective plate 80. The third lower surface 110*e* has a second scattering portion 46*e* arranged therein. The second scattering portion 46*e* differs from the second scattering portion 46 by being arranged on the third lower surface 110*e*.

The explanatory diagram illustrated in FIG. 16 is a plan view of the first light guide plate 34*e* as viewed from the Z-axis direction. A sixth region 124*e* illustrated in FIG. 16 with hatched lines is a region in the first lower surface 38 that is located between the first side surface 40 and the first scattering portion 44. A seventh region 126*e* illustrated in FIG. 16 with hatched lines is a region in the first lower surface 38 that is located between the second side surface 42 and the first scattering portion 44. As illustrated in FIG. 16, the third scattering portion 64*e* is arranged overlapping the sixth region 124*e* as viewed from the Z-axis direction. The second scattering portion 46*e* is arranged overlapping the seventh region 126*e* as viewed from the Z-axis direction.

The second illuminator 74*e* differs from the second illuminator 74 by having the light source elements 74A, 74B, 74C, 74D, 74E, 74F, and 74G arranged along the fifth side surface 112*e*.

As illustrated in FIG. 15 and FIG. 16, the light blocking portion 130*e* is a member having a rectangular parallelepiped shape. The light blocking portion 130*e* is made of, for example, a resin material capable of blocking light. The light blocking portion 130*e* has substantially the same thickness in the Z-axis direction as the second light guide plate 54*e* and the third light guide plate 106*e*. The light blocking portion 130*e* has an upper surface 132*e*, side surfaces 134*e* and 136*e*, and a lower surface 138*e*. The light blocking portion 130*e* has the upper surface 132*e* arranged in contact with a reflective plate 140*e*. The light blocking portion 130*e* has the side surface 134*e* arranged facing the fourth side surface 62 with an air layer therebetween. The light blocking portion 130*e* has the side surface 136*e* arranged facing the sixth side surface 114*e* with an air layer therebetween. The light blocking portion 130*e* has the lower surface 138*e* arranged in contact with the reflective plate 80.

This configuration enables the light blocking portion 130*e* to block light that has leaked toward the third light guide plate 106*e* from the second light guide plate 54*e*. This configuration enables the light blocking portion 130*e* to block light that has leaked toward the second light guide plate 54*e* from the third light guide plate 106*e*.

As illustrated in FIG. 15, the reflective plate 140e is identical to the reflective plate 80 except that the reflective plate 140e is arranged between the first scattering portion 44 and the light blocking portion 130e. This configuration enables the reflective plate 140e to reflect light that has passed through the first scattering portion 44 and leaked to the outside of the first light guide plate 34e. Thus, light emitted by the first illuminator 70 that enters the first light guide plate 34e can be efficiently scattered by the first scattering portion 44.

Preferably, the light blocking portion 130e is made of a material having a thermal expansion coefficient close to those of the second light guide plate 54e and the third light guide plate 106e. Preferably, the light blocking portion 130e is made of the same material as those of the second light guide plate 54e and the third light guide plate 106e. Such preferable conditions enable the light blocking portion 130e to be thermally deformed to substantially the same extent as the second light guide plate 54e and the third light guide plate 106e even when the temperature of the display device 1e changes. Thus, gaps due to thermal deformation can be prevented from being formed between the light blocking portion 130e and the reflective plate 140e and between the light blocking portion 130e and the reflective plate 80. Consequently, light can be prevented from leaking from the second light guide plate 54e to the third light guide plate 106e even when the temperature of the display device 1e changes. Therefore, the display device 1e can improve the contrast of the display region 2A.

The preferred embodiments of the present invention have been described above but are not intended to limit the present invention. The embodiments are disclosed as examples and can be modified without departing from the spirit of the present invention. Any modification made as appropriate without departing from the spirit of the present invention naturally falls within the technical scope of the present invention.

Figure 17:
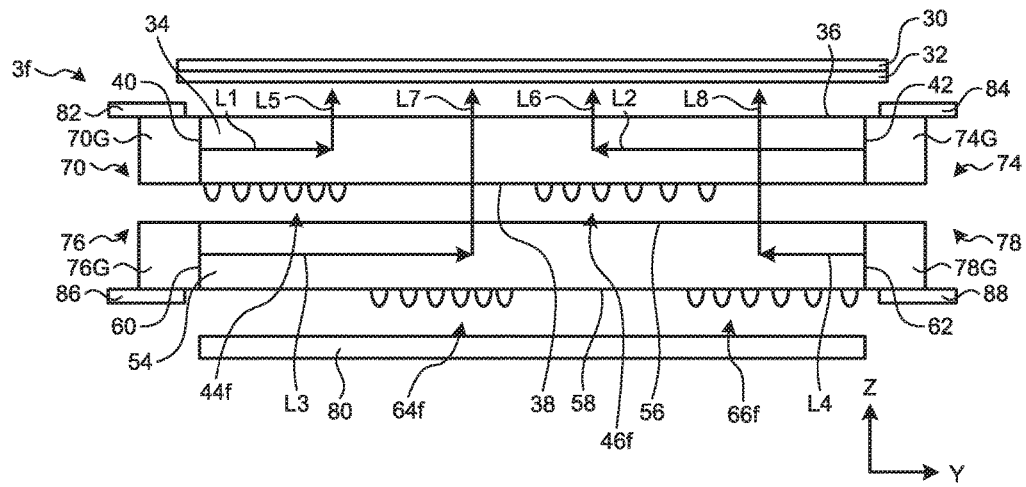
FIG. 17 is a schematic view on an arrow along the X-axis direction of an illumination device according to a first modification of the embodiments.

FIG. 17 is a schematic view on an arrow along the X-axis direction of an illumination device 3f according to a first modification of the embodiments. The same components as those of the display device 1 according to the first embodiment are assigned the same reference signs, and detailed description thereof is omitted. The illumination device 3f is identical to the illumination device 3 except that a first scattering portion 44f, a second scattering portion 46f, a third scattering portion 64f, and a fourth scattering portion 66f are included in place of the first scattering portion 44, the second scattering portion 46, the third scattering portion 64, and the fourth scattering portion 66. Each of the first scattering portion 44f, the second scattering portion 46f, the third scattering portion 64f, and the fourth scattering portion 66f is provided in the form of irregularities and includes a plurality of bumps (dots). The bumps of the first scattering portion 44f have a higher surface density in locations farther from the first illuminator 70. The bumps of the second scattering portion 46f have a higher surface density in locations farther from the second illuminator 74. The bumps of the third scattering portion 64f have a higher surface density in locations farther from the third illuminator 76. The bumps of the fourth scattering portion 66f have a higher surface density in locations farther from the fourth illuminator 78.

Figure 18:
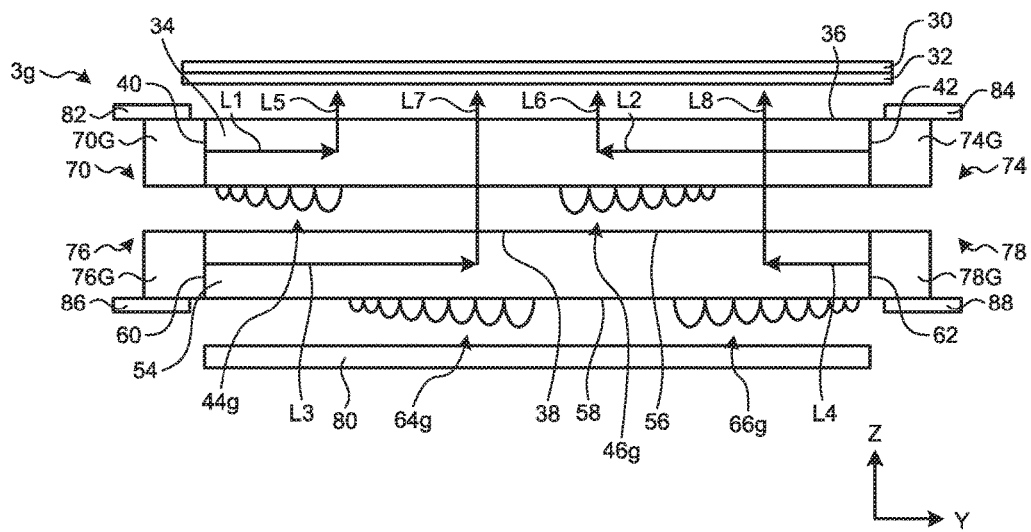
FIG. 18 is a schematic view on an arrow along the X-axis direction of an illumination device according to a second modification of the embodiments.

FIG. 18 is a schematic view on an arrow along the X-axis direction of an illumination device 3g according to a second modification of the embodiments. The same components as those of the display device 1 according to the first embodiment are assigned the same reference signs, and detailed description thereof is omitted. The illumination device 3g is identical to the illumination device 3 except that a first scattering portion 44g, a second scattering portion 46g, a third scattering portion 64g, and a fourth scattering portion 66g are included in place of the first scattering portion 44, the second scattering portion 46, the third scattering portion 64, and the fourth scattering portion 66. Each of the first scattering portion 44g, the second scattering portion 46g, the third scattering portion 64g, and the fourth scattering portion 66g is provided in the form of irregularities and includes a plurality of bumps (dots). The bumps of the first scattering portion 41g have larger shapes in location farther from the first illuminator 70. The bumps of the second scattering portion 46g have larger shapes in location farther from the second illuminator 74. The bumps of the third scattering portion 64g have larger shapes in location farther from the third illuminator 76. The bumps of the fourth scattering portion 66g have larger shapes in location farther from the fourth illuminator 78.

The first modification of embodiments and the second modification of embodiments are applicable not only to the first embodiment but also to the second to the sixth embodiments.

This disclosure includes the following aspects:

(1) An illumination device including:

a first light guide plate including a first scattering portion, a second scattering portion, and a first region having neither the first scattering portion nor the second scattering portion arranged therein;

a second light guide plate including a third scattering portion and a fourth scattering portion;

a first illuminator configured to emit light in a first direction to a first side surface of the first light guide plate;

a second illuminator configured to emit light to a second side surface opposite to the first side surface;

a third illuminator configured to emit light in the first direction to a third side surface of the second light guide plate; and a fourth illuminator configured to emit light to a fourth side surface opposite to the third side surface, wherein the second light guide plate overlaps the first light guide plate as viewed from a direction of the thicknesses thereof (that is, in extension directions in which the first and second light guide plates extend), and the third scattering portion and the fourth scattering portion overlap the first region as viewed from the direction of the thicknesses.

(2) The illumination device according to (1), wherein the first region includes a second region and a third region, the first scattering portion is arranged between the second scattering portion and the first side surface, the second region is arranged between the first scattering portion and the second scattering portion, the third region is arranged between the second scattering portion and the second side surface, the third scattering portion overlaps the second region as viewed from the direction of the thicknesses, and the fourth scattering portion overlaps the third region as viewed from the direction of the thicknesses.

(3) The illumination device according to (2), wherein the third scattering portion partly overlaps each of the first scattering portion and the second scattering portion as viewed from the direction of the thicknesses, and the fourth scattering portion partly overlaps the second scattering portion as viewed from the direction of the thicknesses.

(4) The illumination device according to (1), wherein
the first scattering portion is arranged between the second scattering portion and the first side surface in the first direction,
the first region is arranged between the first scattering portion and the second scattering portion, and
the third scattering portion and the fourth scattering portion do not overlap each other as viewed from the direction of the thicknesses and are arranged along the first direction.
(5) The illumination device according to (4), wherein
the third scattering portion partly overlaps the first scattering portion as viewed from the direction of the thicknesses, and
the fourth scattering portion partly overlaps the second scattering portion as viewed from the direction of the thicknesses.
(6) The illumination device according to (4) or (5), further including an optical coupler interjacent between the first light guide plate and the second light guide plate.
(7) The illumination device according to any one of (4) to (6), further including a first reflective member and a second reflective member that are interjacent between the first light guide plate and the second light guide plate, wherein
the first reflective member is arranged overlapping the first scattering portion as viewed from the direction of the thicknesses, and
the second reflective member is arranged overlapping the second scattering portion as viewed from the direction of the thicknesses.
(8) An illumination device including:
a first light guide plate including a first scattering portion, a second scattering portion, and a first region having neither the first scattering portion nor the second scattering portion arranged therein;
a second light guide plate including a third scattering portion;
a third light guide plate including a fourth scattering portion;
a first illuminator configured to emit light in a first direction to a first side surface of the first light guide plate;
a second illuminator configured to emit light to a second side surface opposite to the first side surface;
a third illuminator configured to emit light in the first direction from a third side surface of the second light guide plate toward a fourth surface opposite to the third side surface; and
a fourth illuminator configured to emit light in the first direction from a fifth side surface of the third light guide plate toward a sixth side surface opposite to the fifth side surface, wherein
the second light guide plate has an area smaller than that of the first light guide plate and overlaps the first light guide plate as viewed from a direction of thicknesses thereof (that is, in extension directions in which the first, second, and third light guide plates extend),
the third light guide plate has an area smaller than that of the first light guide plate and overlaps the first light guide plate as viewed from the direction of the thicknesses in a position different from a position where the second light guide plate overlaps the first light guide plate, and
the third scattering portion and the fourth scattering portion overlap the first region as viewed from the direction of the thicknesses.
(9) The illumination device according to (8), wherein the second light guide plate and the third light guide plate are arranged facing an exit side of the first light guide plate, the exit side being a side from which light exits.
(10) The illumination device according to any one of (1) to (9), wherein
the first scattering portion has a plurality of grooves that are deeper is locations farther from the first illuminator,
the second scattering portion has a plurality of grooves that are deeper in locations farther from the second illuminator,
the third scattering portion has a plurality of grooves that are deeper in locations farther from the third illuminator, and
the fourth scattering portion has a plurality of grooves that are deeper in locations farther from the fourth illuminator.
(11) The illumination device according to any one of (1) to (9), wherein
the first scattering portion has a plurality of bumps that have a higher surface density in a location farther from the first illuminator,
the second scattering portion has a plurality of bumps that have a higher surface density in a location farther from the second illuminator,
the third scattering portion has a plurality of bumps that have a higher surface density in a location farther from the third illuminator, and
the fourth scattering portion has a plurality of bumps that have a higher surface density in a location farther from the fourth illuminator.
(12) The illumination device according to any one of (1) to (9), wherein
the first scattering portion has a plurality of bumps that have larger shapes in locations farther from the first illuminator,
the second scattering portion has a plurality of bumps that have larger shapes is locations farther from the second illuminator,
the third scattering portion has a plurality of bumps that have larger shapes is locations farther from the third illuminator, and
the fourth scattering portion has a plurality of bumps that have larger shapes is locations farther from the fourth illuminator.
(13) An illumination device including:
a first light guide plate including a first scattering portion and a first region that does not have the first scattering portion arranged therein;
a second light guide plate including a second scattering portion;
a third light guide plate including a third scattering portion;
a first illuminator configured to emit light in a first direction from a first side surface of the first light guide plate toward a second side surface opposite to the first side surface;
a second illuminator configured to emit light in the first direction from a third side surface of the second light guide plate toward a fourth side surface opposite to the third side surface; and
a third illuminator configured to emit light in the first direction from a fifth side surface of the third light guide plate toward a sixth side surface opposite to the fifth side surface, wherein
the second light guide plate has an area smaller than that of the first light guide plate and overlaps the first light guide plate as viewed from a direction of thicknesses thereof (that is, in extension directions in which the first, second, and third light guide plates extend), the third light guide plate has an area smaller than that of the first light guide plate and overlaps the first light guide plate as viewed from the direction of the thicknesses in a position different from a position where the second light guide plate overlaps the first light guide plate, and the second scattering portion and the third scattering portion overlap the first region as viewed from the direction of the thicknesses.

(14) The illumination device according to (13), wherein
the first light guide plate is arranged facing an exit side of the second light guide plate and an exit side of the third light guide plate, each exit side being a side from which light exits, and the illumination device further comprises a light blocking portion arranged between the fourth side surface of the second light guide plate and the sixth side surface of the third light guide plate, wherein the light blocking portion is configured to block light from entering the third light guide plate from the second light guide plate and block light from entering the second light guide plate from the third light guide plate.

(15) The illumination device according to (14), further including a reflective member interjacent between the light blocking portion and the first light guide plate.

(16) The illumination device according to any one of (13) to (15), wherein
the first scattering portion has a plurality of grooves that are deeper in locations farther from the first illuminator,
the second scattering portion has a plurality of grooves that are deeper in locations farther from the second illuminator, and
the third scattering portion has a plurality of grooves that are deeper in locations farther from the third illuminator.

(17) The illumination device according to any one of (13) to (15), wherein
the first scattering portion has a plurality of bumps that have a higher surface density in a location farther from the first illuminator,
the second scattering portion has a plurality of bumps that have a higher surface density in a location farther from the second illuminator, and
the third scattering portion has a plurality of bumps that have a higher surface density in a location farther from the third illuminator.

(18) The illumination device according to any one of (13) to (15), wherein
the first scattering portion has a plurality of bumps that have larger shapes in locations farther from the first illuminator,
the second scattering portion has a plurality of bumps that have larger shapes in locations farther from the second illuminator, and
the third scattering portion has a plurality of bumps that have larger shapes in locations farther from the third illuminator.

(19) A display device including the illumination device according to any one of (1) to (18).

An illumination device including:
a first light guide plate including a first scattering region, a second scattering region, and a first region having neither the first scattering region nor the second scattering region arranged therein;
a second light guide plate including a third scattering portion overlapping the first region; and
a plurality of light source elements provided facing a side surface of the first light guide plate and a side surface of the second guide light plate, wherein
each of the first scattering region, the second scattering region, and the third scattering region has a plurality of grooves that are deeper in locations farther from the light source elements.

An illumination device including:
a first light guide plate including a first scattering region, a second scattering region, and a first region having neither the first scattering region nor the second scattering region arranged therein;
a second light guide plate including a third scattering portion overlapping the first region; and
a plurality of light source elements provided facing a side surface of the first light guide plate and a side surface of the second guide light plate, wherein
each of the first scattering region, the second scattering region, and the third scattering region has a plurality of bumps that have a higher surface density in a location farther from the light source elements.

An illumination device including:
a first light guide plate including a first scattering region, a second scattering region, and a first region having neither the first scattering region nor the second scattering region arranged therein;
a second light guide plate including a third scattering portion overlapping the first region; and
a plurality of light source elements provided facing a side surface of the first light guide plate and a side surface of the second guide light plate, wherein
each of the first scattering region, the second scattering region, and the third scattering region has a plurality of bumps that have larger shapes in locations farther from the light source elements.

An illumination device including:
a first light guide plate including a first scattering region, a second scattering region, and a first region having neither the first scattering region nor the second scattering region arranged therein;
a second light guide plate including a third scattering portion overlapping the first region;
a third light guide plate including a fourth scattering region overlapping the first region in a position different from a position where the third scattering region overlaps the first region; and
a plurality of light source elements provided facing a side surface of the first light guide plate, a side surface of the second guide light plate, and a side surface of the third guide light plate, wherein
each of the first scattering region, the second scattering region, the third scattering region, and the fourth scattering region has a plurality of grooves that are deeper in locations farther from the light source elements.

An illumination device including:
a first light guide plate including a first scattering region, a second scattering region, and a first region having neither the first scattering region nor the second scattering region arranged therein;
a second light guide plate including a third scattering portion overlapping the first region;
a third light guide plate including a fourth scattering region overlapping the first region in a position different from a position where the third scattering region overlaps the first region; and
a plurality of light source elements provided facing a side surface of the first light guide plate, a side surface of the second guide light plate, and a side surface of the third guide light plate, wherein each of the first scattering region, the second scattering region, the third scattering region, and the fourth scattering region has a plurality of bumps that have a higher surface density in a location farther from the light source elements.

An illumination device including:
a first light guide plate including a first scattering region, a second scattering region, and a first region having neither the first scattering region nor the second scattering region arranged therein;
a second light guide plate including a third scattering portion overlapping the first region;
a third light guide plate including a fourth scattering region overlapping the first region in a position different from a position where the third scattering region overlaps the first region; and
a plurality of light source elements provided facing a side surface of the first light guide plate, a side surface of the second guide light plate, and a side surface of the third guide light plate, wherein
each of the first scattering region, the second scattering region, the third scattering region, and the fourth scattering region has a plurality of bumps that have larger shapes in locations farther from the light source elements.

What is claimed is:

1. An illumination device comprising:
a first light guide plate including a first scattering portion, a second scattering portion, and a first region having neither the first scattering portion nor the second scattering portion arranged therein;
a second light guide plate including a third scattering portion and a fourth scattering portion;
a first illuminator configured to emit light in a first direction to a first side surface of the first light guide plate;
a second illuminator configured to emit light to a second side surface opposite to the first side surface;
a third illuminator configured to emit light in the first direction to a third side surface of the second light guide plate; and
a fourth illuminator configured to emit light to a fourth side surface opposite to the third side surface, wherein
the second light guide plate overlaps the first light guide plate as viewed from a direction of the thicknesses thereof, and
the third scattering portion and the fourth scattering portion overlap the first region as viewed from the direction of the thicknesses further comprising a first reflective member and a second reflective member that are interjacent between the first light guide plate and the second light guide plate, where
the first reflective member is arranged overlapping the first scattering portion as viewed from the direction of the thicknesses, and
the second reflective member is arranged overlapping the second scattering portion as viewed from the direction of the thicknesses.

2. The illumination device according to claim 1, wherein the first region includes a second region and a third region,
the first scattering portion is arranged between the second scattering portion and the first side surface,
the second region is arranged between the first scattering portion and the second scattering portion,
the third region is arranged between the second scattering portion and the second side surface,
the third scattering portion overlaps the second region as viewed from the direction of the thicknesses, and
the fourth scattering portion overlaps the third region as viewed from the direction of the thicknesses.

3. The illumination device according to claim 2, wherein the third scattering portion partly overlaps each of the first scattering portion and the second scattering portion as viewed from the direction of the thicknesses, and
the fourth scattering portion partly overlaps the second scattering portion as viewed from the direction of the thicknesses.

4. The illumination device according to claim 1, wherein the first scattering portion is arranged between the second scattering portion and the first side surface in the first direction,
the first region is arranged between the first scattering portion and the second scattering portion, and
the third scattering portion and the fourth scattering portion do not overlap each other as viewed from the direction of the thicknesses and are arranged along the first direction.

5. The illumination device according to claim 4, wherein the third scattering portion partly overlaps the first scattering portion as viewed from the direction of the thicknesses, and
the fourth scattering portion partly overlaps the second scattering portion as viewed from the direction of the thicknesses.

6. The illumination device according to claim 4, further comprising an optical coupler interjacent between the first light guide plate and the second light guide plate.

7. The illumination device according to claim 1, wherein the first scattering portion has a plurality of grooves that are deeper in locations farther from the first illuminator,
the second scattering portion has a plurality of grooves that are deeper in locations farther from the second illuminator,
the third scattering portion has a plurality of grooves that are deeper in locations farther from the third illuminator, and
the fourth scattering portion has a plurality of grooves that are deeper in locations farther from the fourth illuminator.

8. The illumination device according to claim 1, wherein the first scattering portion has a plurality of bumps that have a higher surface density in a location farther from the first illuminator,
the second scattering portion has a plurality of bumps that have a higher surface density in a location farther from the second illuminator,
the third scattering portion has a plurality of bumps that have a higher surface density in a location farther from the third illuminator, and
the fourth scattering portion has a plurality of bumps that have a higher surface density in a location farther from the fourth illuminator.

9. The illumination device according to claim 1, wherein the first scattering portion has a plurality of bumps that have larger shapes is locations farther from the first illuminator,
the second scattering portion has a plurality of bumps that have larger shapes is locations farther from the second illuminator,
the third scattering portion has a plurality of bumps that have larger shapes is locations farther from the third illuminator, and
the fourth scattering portion has a plurality of bumps that have larger shapes in locations farther from the fourth illuminator.

10. A display device comprising the illumination device according to claim 1.

* * * * *